(12) United States Patent
Theissl

(10) Patent No.: US 10,669,930 B2
(45) Date of Patent: Jun. 2, 2020

(54) RECIPROCATING PISTON MACHINE COMPRISING A LENGTH ADJUSTABLE CONNECTING ROD AND AN INDUCTIVELY ACTUATABLE CONTROL VALVE

(71) Applicant: AVL LIST GMBH, Graz (AT)

(72) Inventor: Mario Theissl, Schwanberg (AT)

(73) Assignee: AVL LIST GMBH, Graz (AT)

(*) Notice: Subject to any disclaimer, the term of this patent is extended or adjusted under 35 U.S.C. 154(b) by 0 days.

(21) Appl. No.: 16/062,238

(22) PCT Filed: Dec. 14, 2016

(86) PCT No.: PCT/EP2016/080940
§ 371 (c)(1),
(2) Date: Jun. 14, 2018

(87) PCT Pub. No.: WO2017/102815
PCT Pub. Date: Jun. 22, 2017

(65) Prior Publication Data
US 2018/0363546 A1    Dec. 20, 2018

(30) Foreign Application Priority Data

Dec. 14, 2015  (AT) .............................. A 51062/2015
Apr. 29, 2016  (AT) .............................. A 50390/2016

(51) Int. Cl.
*F02B 75/04* (2006.01)
*F16C 7/06* (2006.01)
(Continued)

(52) U.S. Cl.
CPC ............ *F02B 75/045* (2013.01); *F02D 15/02* (2013.01); *F16C 7/04* (2013.01); *F16C 7/06* (2013.01);
(Continued)

(58) Field of Classification Search
CPC .............................. F02B 75/045; F02B 75/048
See application file for complete search history.

(56) References Cited

U.S. PATENT DOCUMENTS

| 988,344 A | 4/1911 | Holzmueller |
| 1,610,137 A | 12/1926 | Kratsch |
(Continued)

FOREIGN PATENT DOCUMENTS

| AT | 511803 | 3/2013 |
| AT | 512334 | 7/2013 |
(Continued)

OTHER PUBLICATIONS

Official Action for Austria Patent Application No. 50713/2015, dated Jul. 6, 2016, 3 pages.
(Continued)

*Primary Examiner* — Long T Tran
(74) *Attorney, Agent, or Firm* — Sheridan Ross P.C.

(57) ABSTRACT

The invention relates to a reciprocating-piston machine, in particular an internal combustion engine, comprising at least one length-adjustable connecting rod (1) connected to a crank pin (21) of a crankshaft (26), wherein the connecting rod (1) comprises at least one length-adjustment mechanism (6) and at least one electrically switchable and inductively actuatable control valve (7). According to the invention, in order to enable a flexible alteration of the compression ratio in the easiest, most space-saving and reliable manner possible, the connection rod (1) has at least one induction device (11) which is arranged in the region of a large connecting-rod eye (5) of the connecting rod (1), in a position in the connecting rod (1), extending from at least one end face (13) of the connecting rod (1) and separated from a longitudinal axis (21a) of the crank pin (21) by a crank pin distance (a), wherein the induction device (11) is or can be electrically connected to the control valve (7) and an electrical current (Continued)

Figure 1:
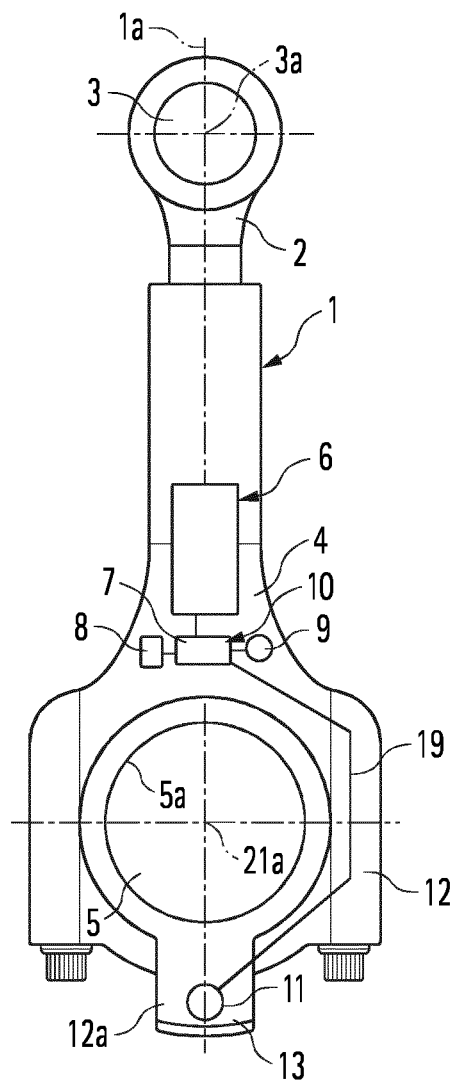

can be induced in the induction device (11) during rotation of the crankshaft (20) by means of at least one starter device (14) attached to the crankshaft.

11 Claims, 7 Drawing Sheets

(51) Int. Cl.
*F16C 7/04* (2006.01)
*F02D 15/02* (2006.01)
*F16K 31/00* (2006.01)

(52) U.S. Cl.
CPC ........ *F16K 31/004* (2013.01); *F16C 2360/22* (2013.01)

(56) References Cited

U.S. PATENT DOCUMENTS

| | | | |
|---|---|---|---|
| 2,033,601 A | 3/1936 | Wohanka | |
| 2,134,995 A | 11/1938 | Anderson | |
| 2,217,721 A | 10/1940 | Anthony | |
| 2,252,153 A | 8/1941 | Anthony | |
| 2,778,378 A | 1/1957 | Presnell | |
| 2,989,954 A | 6/1961 | Hulbert | |
| 3,171,334 A | 3/1965 | Rasmussen | |
| 4,124,002 A | 11/1978 | Crise | |
| 4,140,091 A | 2/1979 | Showers, Jr. | |
| 4,195,601 A | 4/1980 | Crise | |
| 4,370,901 A | 2/1983 | Bolen | |
| 4,406,256 A | 9/1983 | Akkerman | |
| 5,178,103 A | 1/1993 | Simko | |
| 5,562,068 A | 10/1996 | Sugimoto et al. | |
| 5,724,863 A | 3/1998 | Kramer et al. | |
| 5,960,750 A * | 10/1999 | Kreuter | F02B 75/045 123/48 B |
| 6,394,048 B1 * | 5/2002 | Styron | F16C 7/06 123/48 B |
| 6,604,496 B2 | 8/2003 | Bartsch et al. | |
| 9,528,546 B2 | 12/2016 | Melde-Tuczai | |
| 9,670,952 B2 | 6/2017 | Melde-Tuczai et al. | |
| 9,845,738 B2 | 12/2017 | Pluta | |
| 2004/0187634 A1 | 9/2004 | Meyer | |
| 2008/0115769 A1 * | 5/2008 | Mason | F01L 1/38 123/48 B |
| 2008/0251158 A1 | 10/2008 | Koch | |
| 2009/0107467 A1 | 4/2009 | Berger | |
| 2009/0205615 A1 | 8/2009 | Cannata | |
| 2010/0132672 A1 | 6/2010 | Lee et al. | |
| 2010/0218746 A1 | 9/2010 | Rabhi | |
| 2013/0247879 A1 | 9/2013 | Von Mayenburg | |
| 2015/0152794 A1 | 6/2015 | Paul | |
| 2016/0222880 A1 | 8/2016 | Velazquez | |
| 2016/0237889 A1 * | 8/2016 | Melde-Tuczai | F02B 75/045 |
| 2016/0305471 A1 | 10/2016 | Wittek | |
| 2016/0333780 A1 * | 11/2016 | Kamo | F02B 75/045 |
| 2018/0266313 A1 | 9/2018 | Melde-Tuczai et al. | |
| 2018/0371988 A1 | 12/2018 | Melde-Tuczai et al. | |
| 2019/0234300 A1 | 8/2019 | Melde-Tuczai et al. | |
| 2019/0242300 A1 | 8/2019 | Pichler et al. | |

FOREIGN PATENT DOCUMENTS

| | | |
|---|---|---|
| AT | 514071 | 10/2014 |
| AT | 517100 | 11/2016 |
| AT | 517112 | 11/2016 |
| AT | 517217 | 12/2016 |
| AT | 517492 | 2/2017 |
| AT | 517619 | 3/2017 |
| AT | 517624 | 3/2017 |
| AT | 517718 | 4/2017 |
| CN | 102330561 | 1/2012 |
| CN | 103047409 | 4/2013 |
| CS | 229539 | 6/1984 |
| DE | 1205390 | 11/1965 |
| DE | 1287345 | 1/1969 |
| DE | 2161580 | 7/1973 |
| DE | 2414020 | 10/1975 |
| DE | 3149306 | 6/1983 |
| DE | 8429462 | 2/1985 |
| DE | 3507327 | 9/1986 |
| DE | 4026492 | 2/1992 |
| DE | 4133188 | 4/1992 |
| DE | 4226361 | 4/1994 |
| DE | 4315463 | 5/1994 |
| DE | 29608749 | 7/1996 |
| DE | 19612721 | 10/1996 |
| DE | 19703948 | 6/1998 |
| DE | 19835146 | 6/1999 |
| DE | 10213890 | 10/2002 |
| DE | 10201601 | 6/2003 |
| DE | 10230427 | 1/2004 |
| DE | 102005036701 | 2/2007 |
| DE | 102005055199 | 5/2007 |
| DE | 102007040699 | 3/2009 |
| DE | 102008038971 | 2/2010 |
| DE | 102010016037 | 9/2011 |
| DE | 102011104934 | 12/2012 |
| DE | 102012020999 | 1/2014 |
| DE | 102013210494 | 12/2014 |
| DE | 102013111617 | 4/2015 |
| DE | 102013113432 | 6/2015 |
| DE | 102014200162 | 7/2015 |
| DE | 102014004987 | 10/2015 |
| DE | 102015001066 | 10/2015 |
| DE | 102014220177 | 5/2016 |
| EP | 0438121 | 7/1991 |
| EP | 1065393 | 1/2001 |
| EP | 2280198 | 2/2011 |
| FR | 2857408 | 1/2005 |
| FR | 2889864 | 2/2007 |
| GB | 161580 | 7/1922 |
| GB | 898268 | 6/1962 |
| GB | 2161580 | 1/1986 |
| JP | S52-9703 | 1/1977 |
| JP | S58-165543 | 9/1983 |
| JP | S61-24804 | 2/1986 |
| JP | 2003-129817 | 5/2003 |
| JP | 2005-267420 | 9/2005 |
| JP | 2010-112286 | 5/2010 |
| JP | 2010-112448 | 5/2010 |
| NL | 7602119 | 9/1977 |
| RU | 2226626 | 4/2004 |
| SU | 1008523 | 3/1983 |
| WO | WO 96/01943 | 1/1996 |
| WO | WO 02/10568 | 2/2002 |
| WO | WO 2012/113349 | 8/2012 |
| WO | WO 2013/092364 | 6/2013 |
| WO | WO 2014/005984 | 1/2014 |
| WO | WO 2014/019684 | 2/2014 |
| WO | WO 2014/188060 | 11/2014 |
| WO | WO 2015/055582 | 4/2015 |
| WO | WO 2015/082722 | 6/2015 |
| WO | WO 2015/172168 | 11/2015 |
| WO | WO 2015/193437 | 12/2015 |
| WO | WO 2016/042605 | 3/2016 |
| WO | WO 2016/083592 | 6/2016 |
| WO | WO 2016/103554 | 6/2016 |
| WO | WO 2016/203047 | 12/2016 |
| WO | WO 2017/001229 | 1/2017 |
| WO | WO 2017/025580 | 2/2017 |

OTHER PUBLICATIONS

Official Action for Austria Patent Application No. 51062/2015, dated Oct. 25, 2016, 3 pages.
Official Action for Austria Patent Application No. 51062/2015, dated Jul. 14, 2017, 2 pages.
Official Action for Austria Patent Application No. 50390/2016, dated Oct. 25, 2016, 3 pages.
Official Action for Austria Patent Application No. 50390/2016, dated Feb. 2, 2018, 2 pages.

(56) References Cited

OTHER PUBLICATIONS

Search Report for Austria Patent Application No. GM 8003/2017, dated Jan. 27, 2017, 3 pages.
International Search Report for International (PCT) Patent Application No. PCT/EP2016/069092, dated Aug. 11, 2016, 2 pages.
International Search Report for International (PCT) Patent Application No. PCT/EP2016/069093, dated Nov. 8, 2016, 2 pages.
International Search Report prepared by the European Patent Office dated Oct. 20, 2016, for International Application No. PCT/EP2016/069094.
English Translation of the Written Opinion for International (PCT) Patent Application No. PCT/EP2016/069094, dated Nov. 8, 2016, 6 pages.
International Search Report for International (PCT) Patent Application No. PCT/EP2016/069313, dated Nov. 8, 2016, 3 pages.
International Search Report prepared by the European Patent Office dated Feb. 21, 2017, for International Application No. PCT/EP2016/080940.
English Translation of the International Preliminary Report on Patentability for International (PCT) Patent Application No. PCT/EP2016/069094, dated Jun. 28, 2018, 8 pages.
English Translation of the International Preliminary Report on Patentability for International (PCT) Patent Application No. PCT/EP2016/080940, dated Jun. 28, 2018, 8 pages.

\* cited by examiner

US 10,669,930 B2

RECIPROCATING PISTON MACHINE COMPRISING A LENGTH ADJUSTABLE CONNECTING ROD AND AN INDUCTIVELY ACTUATABLE CONTROL VALVE

CROSS REFERENCE TO RELATED APPLICATIONS

This application is a national stage application under 35 U.S.C. 371 and claims the benefit of PCT Application No. PCT/EP2016/080940 having an international filing date of 14 Dec. 2016, which designated the United States, which PCT application claimed the benefit of Austria Patent Application No. A 51062/2015 filed 14 Dec. 2015, and Austria Patent Application No. A 50390/2016 filed 29 Apr. 2016, the disclosure of each of which are incorporated herein by reference.

The invention relates to a reciprocating piston machine, in particular an internal combustion engine, comprising at least one length-adjustable connecting rod connected to a crank pin of a crankshaft, wherein the connecting rod comprises at least one length-adjustment device and at least one electrically switchable and inductively actuatable control valve.

In order to optimize internal combustion engines in terms of emissions and consumption, research is increasingly focusing on variants having variable compression ratio. By changing the compression of an internal combustion engine, full load can be driven at a lower compression ratio, partial load and start at increased ratio. As a result, consumption is improved in the partial load range, compression pressure at start increased by the increased compression ratio, peak pressure at high power reduced by lower ratio, and knocking prevented.

Various solutions are known to this end which in particular have different ways of solving the problem of controlling the compression ratio. In DE 10 2007 040 699 A1, a piston with an actuator is provided in one cylinder consisting of a magnetostrictive material and arranged between the gudgeon pin and piston crown. The length of the actuator is adjusted by a device for generating a variable magnetic field arranged external of the cylinder. Disadvantageous herein is in particular that the magnetostrictive material is susceptible to wear and reproducible behavior is not guaranteed over a longer period of time.

A solution having an length-adjustable connecting rod is known from the applicant's AT 514 071 B1 in which a length adjustment is realized by selectively filling high-pressure chambers. Selective filling thereby ensues by means of a control valve arranged in the connecting rod. In one design variant, the control valve thereby comprises a control piston which is electromagnetically actuatable by means of an induction coil arranged in the crankcase. DE 102 30 427 A1 describes a similar solution. Difficulties in the inductive transfer of energy can thereby arise over longer periods of operation, for example from contamination in the transmission path etc. Moreover, the known solutions require a great deal of space and are complex to manufacture.

It is thus a task of the invention to eliminate these disadvantages of the prior art and enable the flexible changing of the compression ratio in the easiest, most space-saving and reliable manner possible.

According to the invention, this is achieved by the connecting rod having at least one induction device arranged in the region of a large connecting rod eye at a position in the connecting rod which extends from at least one end face of the connecting rod and is separated from a longitudinal axis of the crankpin by a crankpin distance, preferably in a recess, wherein the induction device is or can be electrically connected to the control valve and an electrical current can be induced in the induction device during rotation of the crankshaft by means of at least one exciting apparatus attached to the crankshaft. This thereby enables quickly and easily changing the compression ratio of the internal combustion engine by the inductive actuation of the control valve, for example by a control unit arranged in the crankcase able to be operated continuously and with very little wear. In particular, the invention allows an operating point-independent active changing of compression ratio, which enables the realizing of emission and consumption advantages.

An induction device is herein to be understood as an element in which voltage is induced upon rotation of the crankshaft. The exciting apparatus is an element which induces a change in the magnetic flux and thus effects the generating of an electrical field in the induction device.

The induction device and exciting apparatus are arranged such that a small defined air gap forms between them in the axial direction—thus, in a direction along the crankshaft axis. The exciting apparatus is arranged in a flank of one of the crankshaft crank webs adjacent the connecting rod facing the induction device.

One design variant of the invention provides for the induction device to comprise a coil apparatus arranged around a core of magnetically conductive material, wherein preferably the core and the coil apparatus are captively arranged in the recess. The magnetically conductive material can for example be ferrite, soft iron or a permanent magnet or a permanently magnetic material such as steel, aluminum-nickel-cobalt magnets or rare-earth magnets (neodymium-iron-boron or samarium-cobalt) respectively. The captive arrangement can be achieved for example by bonding, bolting, detachable click-connections or the like.

The induction device consisting of the coil apparatus and core can be directly inserted into the lateral recess of the connecting rod, whereby the recess can be arranged in a bearing cap of a connecting rod bearing. Alternatively thereto, the induction device can also be arranged in an openly designed housing on the side of the connecting rod end face inserted into the recess. The housing can thereby be for example bowl-shaped and inserted and captively fixed into the recess together with the induction device.

To prevent or reduce eddy currents from occurring in the connecting rod bearing cap, at least one of the areas of the connecting rod or connecting rod bearing cap respectively adjacent to the recess consists of a material at a specific electrical conductivity $\sigma$ and/or a material at a permeability $\mu_r$ of at least 1000 (advantageously between 1000 and 3000) and/or having a magnetic field-inhibiting coating at a permeability $\mu_r$ not exceeding 140 000 (advantageously between 50 000 and 140 000). The connecting rod bearing cap or at least the area of the connecting rod around the induction device(s) is thus made from material having good magnetic conductivity but poor electrical conductivity. This thereby prevents magnetic field lines from penetrating the connecting rod bearing cap and thus the developing of eddy currents which would lead to heat being generated in the connecting rod and thus decreased efficiency.

Preferably, the exciting apparatus comprises at least one magnet element, preferably a permanent magnet element, fixedly connected to the crankshaft which is disposed at the crankpin distance away from the longitudinal axis of the crankpin. The exciting apparatus can thereby also comprise multiple magnet elements fixedly connected to the crankshaft radially disposed at the crankpin distance away from the longitudinal axis of the crankpin, wherein preferably two respective adjacent magnet elements on the side of the connecting rod end face have different magnetic polarities. Rotation of the crankshaft thereby produces a variable magnetic flux in the induction device and induces a voltage. Alternatively to multiple magnet elements, the exciting apparatus can be formed by a ring element fixedly connected to or formed integrally with a crankpin-side flank of a crankshaft crank web which at least partially surrounds the longitudinal axis of the crankpin.

The ring element can thereby be realized as at least one of the following groups: a magnetic ring with a radius at least equal to the crankpin distance, wherein preferably at least two adjacent pole segments oriented toward the end face of the connecting rod have a different magnetic polarity; a segment ring with a radius at least equal to the crankpin distance having at least one recess and at least one adjacent projection, wherein the recess and projection are defined to be oriented along the radially running direction; a toothed ring with a radius at least equal to the crankpin distance having at least one recess and at least one adjacent projection, wherein the recess and projection are defined to run along the axial direction parallel to the longitudinal axis of the crankpin, and facing the connecting rod end face; a defined rippled area with radially or circumferentially alternating projections and recesses designed running in a normal plane, which is normal to the longitudinal axis of the crankpin in the crankpin-side flank.

The different variants of the ring element effect a variable magnetic field in the case of the magnetic ring; in the remaining cases, the air gap between the induction device and the exciting apparatus varies during rotation of the crankshaft, whereby a change is effected in the magnetic flux and thus an electrical field generated, which results in voltage induction in the induction device.

In a simple design variant of the invention, only one induction device is provided in the connecting rod bearing cap. If higher electrical power is needed, then multiple, preferably two or three, induction devices can also be arranged in the connecting rod bearing cap, their longitudinal axes disposed parallel to the longitudinal axis of the crankpin. The induction devices are each arranged at least at the crankpin distance from the longitudinal axis of the crankpin.

The connecting rod or connecting rod bearing cap respectively is preferentially designed with a greater thickness in the area of the recesses than in the remaining area of the connecting rod bearing cap and connecting rod bearing eye so as to form—to achieve the best possible effect—the smallest possible air gap between the connecting rod and crank web. The remaining area of the large connecting rod eye is at a greater distance to the adjacent crank web, the disadvantageous eddy current effect therefore being somewhat lower in these areas. In principle, it thus suffices to provide for the above-cited measures in the area of the connecting rod bearing cap adjacent the recess in which the connecting rod bearing cap exhibits its greatest thickness.

Provided in the further implementation of the invention is for the arranging of at least one energy storage device in the connecting rod which is or can be electrically connected to the induction device and the control valve. The energy storage device enables the energy generated by induction to be stored and provided as needed. A battery, accumulator, supercap or the like can for example be used as the energy storage unit. This thereby ensures the switching functions of an e.g. bistable control valve for opening or closing the connecting rod channels.

All the design variants according to the invention have the advantage of being simple and space-saving in terms of construction and manufacture and reliably enabling flexibly changing the compression ratio. Depending on the rotational speed of the internal combustion engine and the crankshaft, power output between 1 W and up to 5 W (at approx. 3000 rpm) can be provided, which enables reliable control valve switching.

Figure 2:
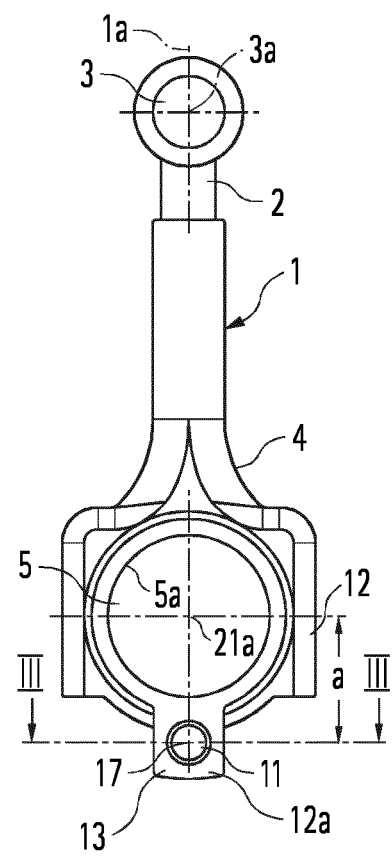
Figure 3:
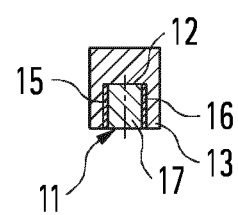
Figure 4:
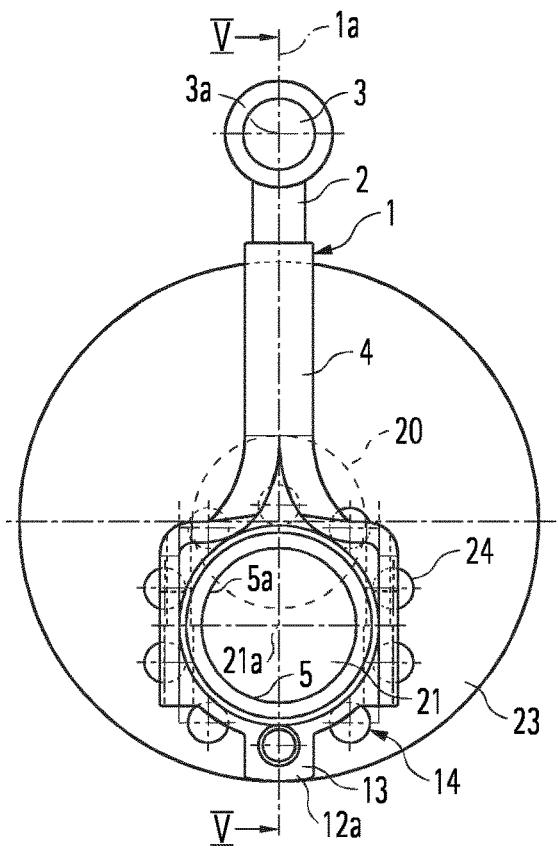
Figure 5:
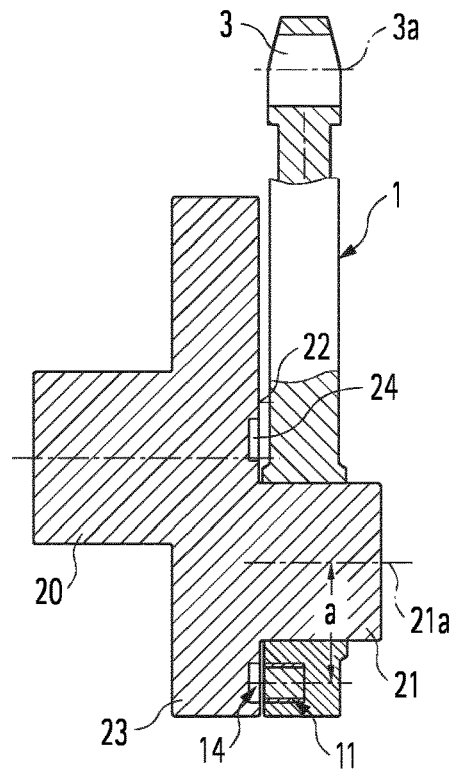
Figure 6:
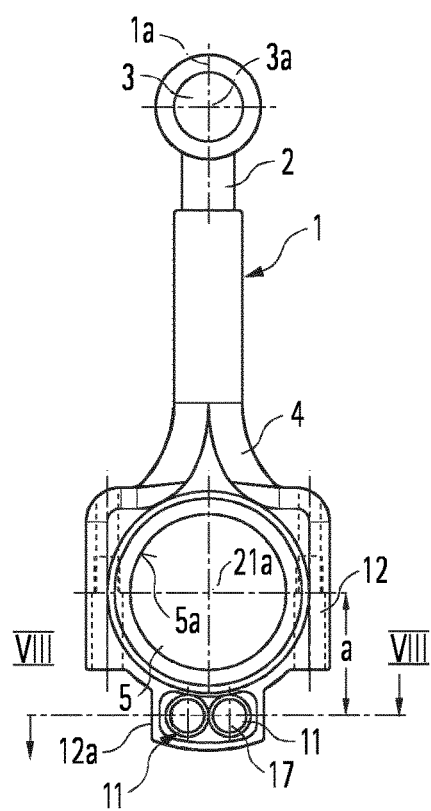
Figure 7:
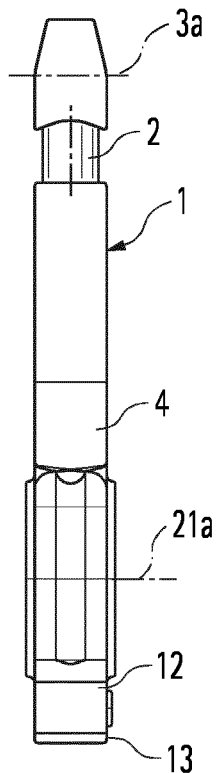
Figure 9:
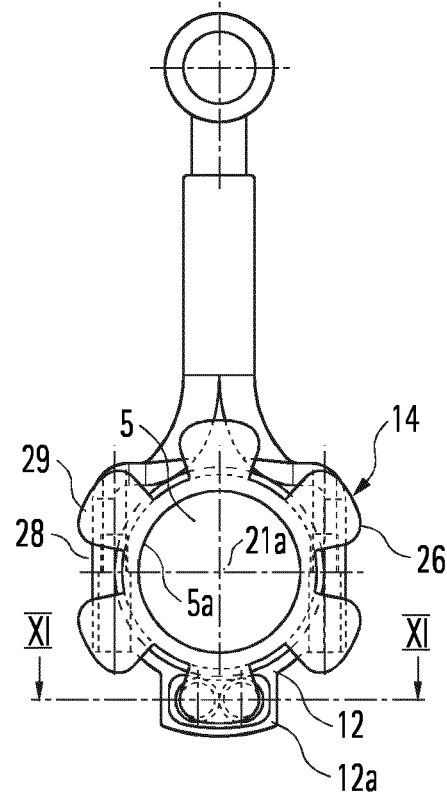
Figure 8:
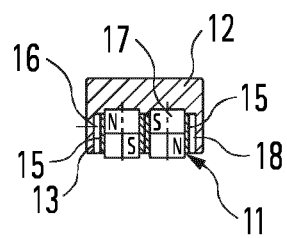
Figure 10:
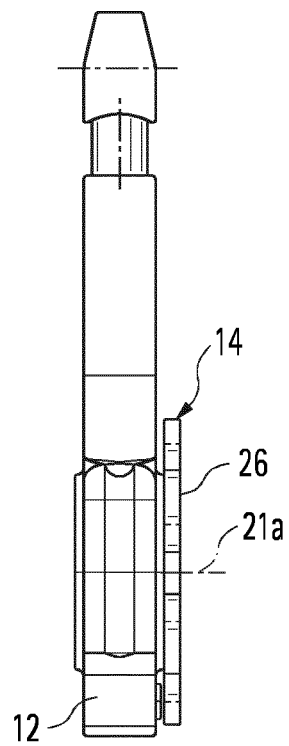
Figure 12:
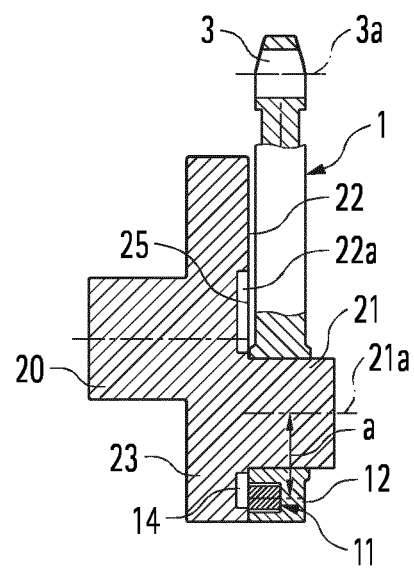
Figure 11:
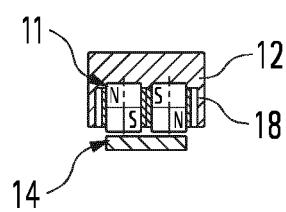
Figure 13:
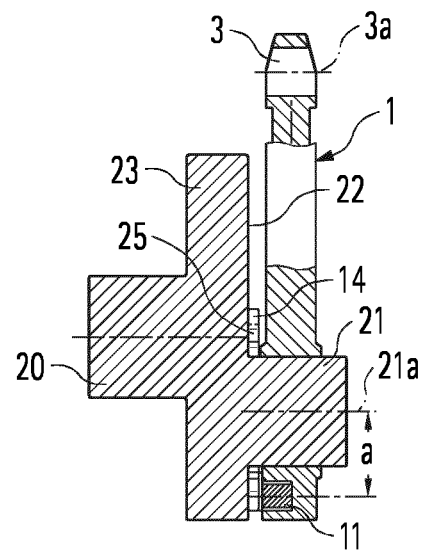
Figure 14:
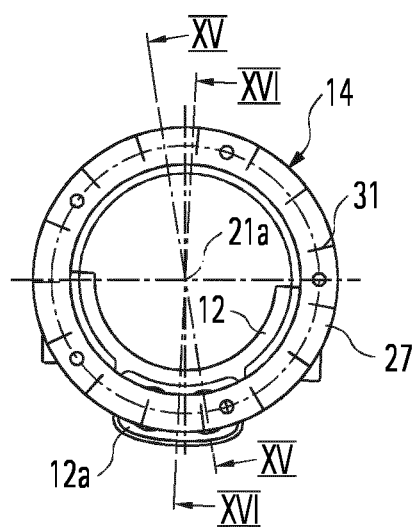
Figure 15:
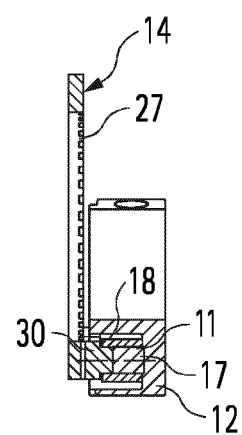
Figures 16, 17:
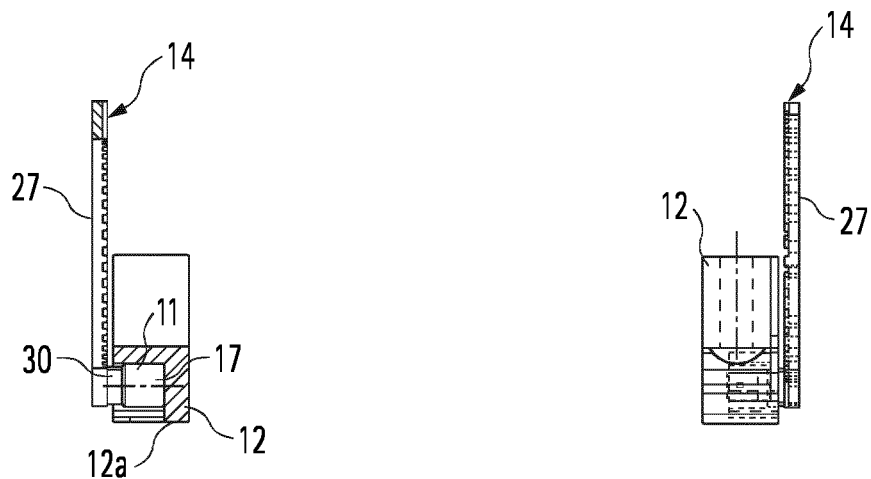
Figure 18:
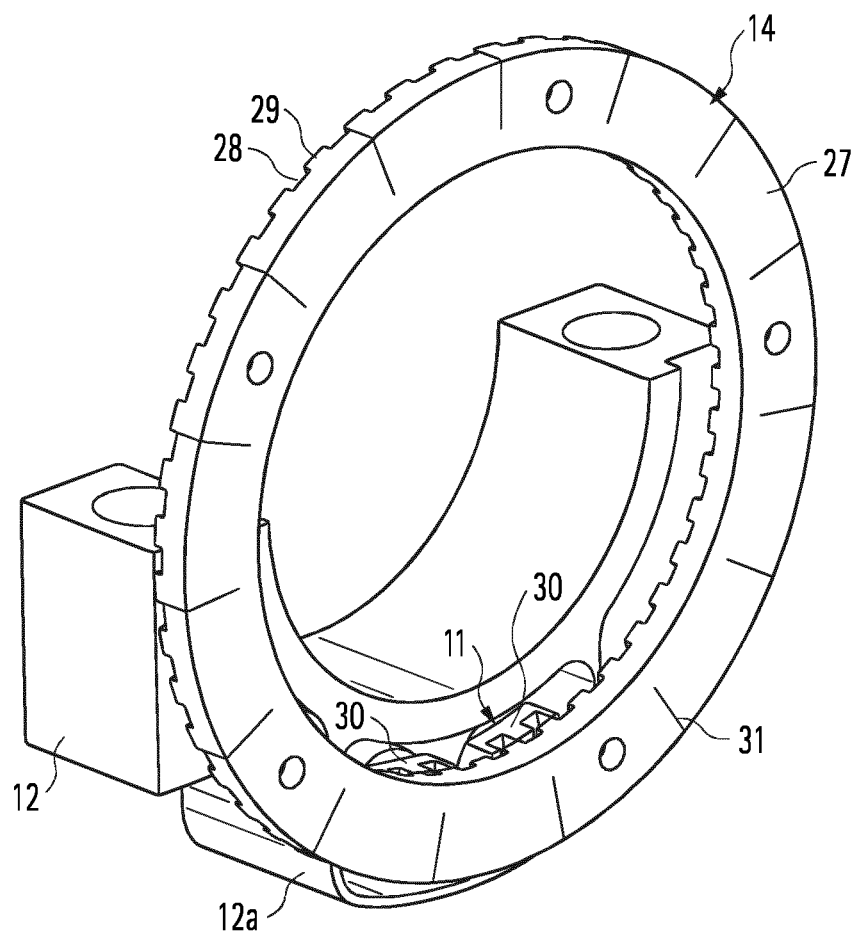
Figure 19:
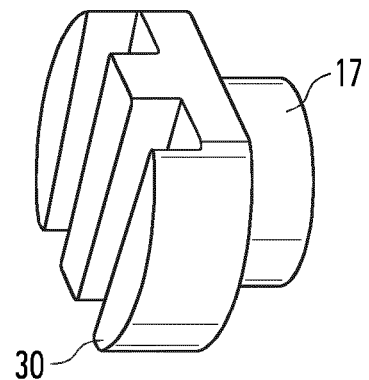
Figure 20:
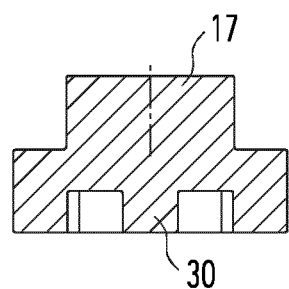
Figure 21:
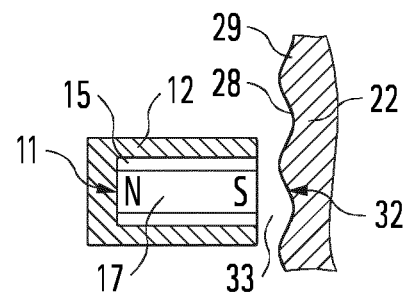

The invention will be described in greater detail in the following on the basis of non-limiting example embodiments as depicted in the figures. Shown therein schematically are:

FIG. 1 a side view of a first embodiment of a connecting rod of a reciprocating piston machine according to the invention together with a control valve as indicated, FIG. 2 a side view of a further connecting rod according to the first embodiment, FIG. 3 the connecting rod from FIG. 2 in a sectional view along the III-III line in FIG. 2, FIG. 4 a side view of the connecting rod from FIG. 2 together with crankshaft and exciting apparatus, FIG. 5 the connecting rod from FIG. 4 in a sectional view along the V-V line in FIG. 4, FIG. 6 a side view of a connecting rod of a reciprocating piston machine according to the invention in a second embodiment, FIG. 7 a frontal view of the connecting rod from FIG. 6, FIG. 8 the connecting rod from FIG. 6 in a sectional view along the VIII-VIII line in FIG. 6, FIG. 9 a side view of the connecting rod from FIG. 6 together with parts of the crankshaft and exciting apparatus, FIG. 10 a frontal view of the connecting rod from FIG. 9, FIG. 11 the connecting rod from FIG. 9 in a sectional view along the XI-XI line in FIG. 9, FIG. 12 a variant of a connecting rod together with crankshaft in a sectional view similar to FIG. 5, FIG. 13 a further variant of a connecting rod together with crankshaft in a sectional view similar to FIG. 5, FIG. 14 a side view of a connecting rod bearing cap as well as a exciting apparatus of a reciprocating piston machine according to the invention in a third embodiment of the invention, FIG. 15 the connecting rod bearing cap including exciting apparatus in a sectional view along the XV-XV line in FIG. 14, FIG. 16 the connecting rod bearing cap including exciting apparatus in a sectional view along the XVI-XVI line in FIG. 14, FIG. 17 a frontal view of the connecting rod bearing cap along with exciting apparatus, FIG. 18 a perspective diagonal view of the FIG. 14 connecting rod bearing cap together with exciting apparatus, FIG. 19 a perspective diagonal view of a pole shoe of the induction device of the connecting rod bearing cap depicted in FIG. 18, FIG. 20 a horizontal sectional view of said pole shoe, and FIG. 21 a fourth inventive design variant of an induction device of a connecting rod of an inventive reciprocating piston machine in longitudinal section.

Functionally identical components have been given the same reference numerals in the various representations of the design variants.

In each case, the figures show a split connecting rod 1 of a reciprocating piston engine, in particular an internal combustion engine, having an upper first rod part 2 with the small connecting rod eye 3 for connecting to a not-shown piston and a lower second rod part 4 with the large connecting rod eye 5 forming a connecting rod bearing 5a for connecting to a crankshaft 20 as visible for example in FIG. 5, 12 or 13. Reference numeral 3a designates a rotational axis of symmetry of the small connecting rod eye 3 coinciding with a not-depicted gudgeon pin axis. The first rod part 2 is adjustable in relation to the second rod part 4 between an extended position and a retracted position by an adjustment range limited by a not further apparent limit stop in the direction of the longitudinal axis 1a of the connecting rod 1. To that end, a length-adjusting apparatus 6 as depicted in FIG. 1 is provided which can be implemented in any desired manner as described for example in the applicant's AT 514 071 B.

The length adjustment can thus ensue as shown in AT 514 071 B by means of a piston element affixed in the upper first rod part 2 which is displaceably guided axially (in the direction of the longitudinal axis 1a of the connecting rod 1) in a guiding cylinder of the lower second rod part 4 of the connecting rod 1, wherein a high-pressure chamber is spanned between a first front face of the piston element facing the large connecting rod eye 5 and the second rod part 4 or guiding cylinder respectively which is connected by an oil channel to a control valve 7 realized as a switching valve which can selectively pressurize the high-pressure chamber with oil pressure. FIG. 1 thus shows a connecting rod 1 which is adjustable in length by means of a length-adjusting apparatus 6 and a control valve 7. The length-adjusting apparatus 6 can be implemented in different ways and is not part of the invention.

To control the control valve 7—thus to selectively subject the high-pressure chamber to oil pressure or respectively actuate the length-adjusting apparatus in a different respective way—a control unit 8 is provided which receives control signals via for example a transmitter/receiver unit (not depicted in the figures) arranged in the crankcase. The control valve 7 forms a current-actuatable device 10 of the connecting rod 1. Reference numeral 9 designates an energy storage device arranged in the connecting rod 1 which is connected to the control unit 8. The energy storage device 9 can for example be a battery, an accumulator, a supercap (i.e. a super or ultracapacitor for storing electrical energy) or the like.

The control valve 7 is or can be electrically connected by an electrical line 19 to at least one induction device 11 arranged in the area of the large connecting rod eye 5 of the connecting rod 1 or in the big end or bottom region 12a of the connecting rod bearing cap 12 respectively. An electric current can be induced in the induction device 11 in at least one position of the connecting rod 1 or during the rotational movement of the crankshaft 20 respectively by means of at least one exciting apparatus 14 attached to the crankshaft. The induction device 11 comprises at least one coil apparatus 15 and is arranged in a recess 16 of the connecting rod 1, or the connecting rod bearing cap 12 of the connecting rod bearing 5a respectively, extending from at least one end face 13 of the connecting rod 1, the recess 16 distanced from a longitudinal axis 21a of the crankpin 21 of the crankshaft 20 by a crankpin distance a (axial spacing). In principle, two or more induction devices 11 can also be provided, each arranged at the crankpin distance a. The crankpin distance a is thereby understood as the distance between the longitudinal axis 21a and the center point of the recess 16 in the radial direction.

The exciting apparatus 14 is arranged on or in at least one crankpin-side flank 22 of a crank web 23 of the crankshaft 20 and can be implemented in different ways as described further below.

The coil apparatus 15 is realized for example as a wound coil of conductive material and arranged around an e.g. cylindrical core 17 firmly inserted into the recess 16 (see FIGS. 2 to 5, FIG. 13). In the example embodiment as depicted, the core 17 consists of a magnetically conductive material such as, for example, ferrite or soft iron or of a permanent magnet or permanently magnetic material such as steel, aluminum-nickel-cobalt magnets or rare-earth magnets (e.g. neodymium-iron-boron, samarium-cobalt or others). The diameter of the core 17 is approximately 80 percent of the outer diameter of the coil apparatus 15 surrounding it. While the at least one electrical line 19 leads from the induction device 11 to the control valve 7, a second, not-depicted line can be grounded, whereby the connecting rod 1 can be used as reference potential.

In order to prevent an unintentional disengaging of the induction device 11, it can be glued, pressed or screwed into the recess 16 or otherwise captively arranged. The core 17 surrounded by the coil apparatus 15 can thereby be directly inserted into the recess. Alternatively thereto, it is also possible for the core 17 together with the coil apparatus 15 to be preinstalled in an open housing 18 on the side of the end face 13 of the connecting rod 1 as one structural unit having a "bowl-shaped" appearance and said structural unit being captively inserted as a whole into the recess 16.

In a first variant of the depicted embodiment, the exciting apparatus 14 attached to the crankshaft comprises at least one magnet element 24 attached to the crankshaft, for example permanent magnets, fixedly connected to the crankshaft 20 and arranged spaced from the longitudinal axis 21a of the crankpin 21 at crankpin distance a. The center or central point of the magnet element 24 thereby exhibits the crankpin distance a from the longitudinal axis 21a of the crankpin 21. The exciting apparatus 14 can thereby be formed by one or more individual magnet elements 24 implemented as permanent magnets.

In the case of multiple (for example ten, see FIG. 4) individual magnet elements 24 realized as permanent magnets arranged in a ring around the longitudinal axis 21a of the crankpin 21, adjacent permanent magnets in each case exhibit different magnetic polarities on the end face 13 side of the connecting rod 1.

When the crankshaft 20 rotates during the operation of the reciprocating piston machine or internal combustion engine, the magnet elements 24 move past the magnetically conductive cores 17 and a voltage is induced in the induction devices 11 by the changing magnetic flux which can be used to operate the control valve 7.

In order to increase the efficiency of the apparatus, measures intended to reduce or respectively prevent eddy currents from being induced in the connecting rod can be taken according to one variant of the invention. It is provided to that end for the connecting rod 1 and/or the connecting rod cap 12 to advantageously albeit completely consist of a material having a specific electrical conductivity a (factoring in the necessary reconciling between magnetic and electrical conductivity, which can vary by several powers of ten depending on material) and/or a material having a permeability $\mu_r$ of at least 1000 to 3000 and/or to comprise a magnetic field line-inhibiting surface coating having a permeability $\mu_r$ not exceeding 50 000 to 140 000 in the areas swept by the exciting apparatus 14, at least in regions adjacent the recesses 16 (can thereby for example also include the bowl-shaped housing 18). Such materials, e.g. ferrite or other sintered materials, which have good magnetic conductivity but poor electrical conductivity hinder current from flowing in the connecting rod 1 and thus thermal losses due to eddy currents. Coating with magnetic field line-inhibiting materials such as mu-metal impedes penetration of magnetic field lines and the inducing of eddy currents.

The elongation of the regions adjacent the recesses 16 depends on different features, e.g. on the choice of magnets/magnetically conductive materials used, the pole pitch, the recess depth M1 (see FIG. 5), the magnetic conductivity of the material of the connecting rod 1 and more. Advantageously, a surrounding region of the recess 16 is realized as described above, the measure of which (understood as a radial extension of the recess edge 16 in the case of a round recess 16) corresponds to a quotient of the air gap width M2 divided by the recess depth M1.

Alternatively to the magnet elements 24 implemented as individual permanent magnets, a ring element 25, 26, 27 arranged concentric to the longitudinal axis 21a of the crankpin 21 which at least partially surrounds the longitudinal axis 21a of the crankpin 21 and is affixed in or to the flank 22 of the crank web 23 of the crankshaft 20 and connected to or formed integrally with same can also be employed.

The distancing of the individual magnet elements 24, or the radius of the ring element 25 respectively, is thereby equal to the crankpin distance a from the longitudinal axis 21a, is thus just as far from the longitudinal axis 21a as the induction device 11. The ring element 25, 26, 27 can be arranged in a milled or eroded groove 22a (FIG. 12) of the flank 22 of the crank web 23 or attached to the flank 22 (FIG. 13).

A first variant of a ring element is depicted in FIGS. 12 and 13. The ring element is implemented therein as magnetic ring 25 having an (average) radius equal to the crankpin distance a, wherein the magnetic ring 25 is arranged in or on a flank 22 of the crank web 23 facing the end face 13 of the connecting rod 1. The magnetic ring 25 consists of pole segments of a magnetic material, whereby each two adjacent pole segments oriented toward the end face 13 of the connecting rod have different magnetic polarities.

When the crankshaft 20 rotates, the magnet elements 24 or magnetic ring 25 respectively induces an electrical voltage in the induction devices 11 of the connecting rod 1 which can be used to supply power to the control valve 7 or to supply the energy storage unit 9.

A further variant of a ring element is depicted in FIGS. 9 to 11 or 15 to 20 where the exciting apparatus 14 is formed by a segment ring 26 (FIGS. 9-11) or toothed ring 27 (FIGS. 15-20) fixedly connected to the crankpin-side flank 22 of the crank web 23 of the crankshaft 20 having at least one defined axial exemption or recess 28 and at least one defined axial projection 29, wherein the exemptions or recesses 28 and projections 29 are spaced at least at crankpin distance a from the longitudinal axis 21a of the crankpin 21. In these variants, the cores 17 of the induction devices 11 are manufactured as permanent magnets or from permanently magnetic materials respectively.

In accordance with FIG. 9, the segment ring 26 comprises adjacently arranged recesses 28 and projections 29 running in the radial direction—meaning that the radius of the segment ring 26 is larger in the area of the projection 29 than in the area of the recess 28, whereby the average radius is approximately equal to the crankpin distance a. The radial extension of the segment ring 26 in the area of the projection 29 is thus larger than the crankpin distance and smaller in the area of the recess 28. This thereby achieves the segment ring 26 only being able to sweep induction devices 11 in the connecting rod 1 during the rotation of the crankshaft 20 in the area of its projections 29, but the segment ring 26 not overlapping the induction devices 11 within the area of the recesses 28.

The rotational motion of the crankshaft 20 therefore changes the magnetic flux in the induction devices 11, whereby voltage is induced in coil apparatus 15 which can be used to operate the control valve 7.

The toothed ring 27—particularly according to FIGS. 15, 16 and 18—comprises recesses 28 and projections 29 in the axial direction; i.e. parallel to the longitudinal axis 21a of the crankpin 21. The recesses 28 and projections 29 are thereby realized on the side of the toothed ring 27 facing the end face 13 of the connecting rod 1 and form a "toothing". The toothing likewise produces a varying magnetic flux in the induction devices 11 which induces a voltage upon the rotation of the crankshaft 20. As depicted in FIGS. 14 and 18, the toothed ring 27 comprises radial slots 31 to reduce the eddy currents occurring during operation. This thus prevents heat from being generated in the toothed ring 27 due to the eddy currents.

In a further variant of the ring element, the exciting apparatus 14 is formed by a defined rippled area 32 in the crankpin-side flank 22 of the crank web 23 having alternating recesses 28 and projections 29 in the plane running normal relative a normal to the longitudinal axis 21a of the crankpin 21, as shown in FIG. 21. The projections 29 and recesses 28 can thereby alternate in the radial direction or the circumferential direction. The sweep past the induction device(s) 11 during the operation or respectively rotation of the crankshaft 20 generates a varying magnetic field which induces a voltage in the induction devices 11 provided with cores 17 realized as permanent magnets or with permanently magnetic materials.

In a further variant of the invention, the cores 17 of the induction device 11 can comprise toothed pole shoes 30, as shown in FIGS. 19 and 20. The toothed pole shoes 30 on the permanent magnets of the core 17 are of similar implementation to the toothed ring 27 and serve to increase the rate of the magnetic flux change and thus the power transferred.

When the crankshaft 20 rotates, the variable air gap in the form of recesses 28 and projections 29 changes the magnetic flux of the permanent magnets or magnetically conductive materials respectively of the core(s) 17, whereby a voltage is induced in the coil apparatus 15. The magnetic flux is thus changed by the variable air gap 33 between the induction device 11 and the exciting apparatus 14.

As described above, i.e. in the variants of FIG. 4 (exciting apparatus 14 in the form of magnet elements 24 realized as permanent magnets arranged in the crank web 22) and FIGS. 12 and 13 (ring element as a magnetic ring 25 with alternating pole segments), the cores 17 of the induction devices 11 are made from magnetically conductive material whereas in the other variants, the cores 17 are realized as permanent magnets or of permanently magnetic materials respectively.

In its described variants, the induction devices 11 enable the inventive solution to achieve power of approximately 1 W (rms value) at crankshaft 20 idling speed (approx. 700 rpm) which can be increased up to 5 W at higher revolutions (e.g. approx. 3000 rpm). Reliable switching of the control valve 7 is thus effectively implemented. Moreover, the energy storage device 9 can also be supplied with sufficient energy to enable switching at times of lower rpm.

The invention claimed is:
1. A reciprocating piston machine comprising at least one length-adjustable connecting rod connected to a crankpin of a crankshaft, wherein the connecting rod comprises at least one length-adjustment device and at least one electrically switchable and inductively actuatable control valve, wherein the connecting rod comprises at least one induction device arranged in the connecting rod in a region of a large connecting rod eye of the connecting rod at a position extending from at least one end face of the connecting rod and distanced from a longitudinal axis of the crankpin by a crankpin distance, the at least one induction device comprises a coil apparatus arranged around a core of magnetically conductive material, and wherein the at least one induction device is or can be electrically connected to the control valve and an electrical current can be induced in the at least one induction device during rotation of the crankshaft by means of at least one exciting apparatus attached to the crankshaft.

2. The reciprocating piston machine according to claim 1, wherein the at least one induction device is arranged in a recess.

3. The reciprocating piston machine according to claim 2, wherein the core and the coil apparatus are captively arranged in the recess.

4. The reciprocating piston machine according to claim 1, wherein the at least one induction device is arranged in an openly designed housing on a side of the end face of the connecting rod, the housing being inserted into a recess.

5. The reciprocating piston machine according to claim 1, wherein at least one area of the connecting rod adjacent to the at least one induction device and/or a recess consists of a material having a permeability $\mu_r$ of at least 1000 and/or a magnetic field line inhibiting surface coating having a permeability $\mu_r$ not exceeding 140,000.

6. The reciprocating piston machine according to claim 1, wherein the at least one induction device and/or a recess is arranged in a bearing cap of a connecting rod bearing.

7. The reciprocating piston machine according to claim 1, wherein the at least one exciting apparatus comprises at least one magnet element fixedly connected to the crankshaft disposed at the crankpin distance away from the longitudinal axis of the crankpin.

8. The reciprocating piston machine according to claim 1, wherein the at least one exciting apparatus comprises a plurality of magnet elements fixedly connected to the crankshaft radially disposed at the crankpin distance from the longitudinal axis of the crankpin, wherein two respective adjacent magnet elements on a side of the end face of the connecting rod have different magnetic polarities.

9. The reciprocating piston machine according to claim 1, wherein the at least one exciting apparatus is formed by a ring element fixedly connected to or formed integrally with a crankpin-side flank of a crank web of the crankshaft which at least partially surrounds the longitudinal axis of the crankpin.

10. The reciprocating piston machine according to claim 9, wherein the ring element is realized as at least one of the following groups:

a magnetic ring with a radius at least equal to the crankpin distance, wherein at least two adjacent pole segments oriented toward the end face of the connecting rod have a different magnetic polarity;

a segment ring with a radius at least equal to the crankpin distance having at least one recess and at least one projection adjacent thereto, wherein the at least one recess and the at least one projection are oriented along a radially running direction;

a toothed ring with a radius at least equal to the crankpin distance having at least one recess and at least one projection adjacent thereto, wherein the at least one recess and the at least one projection are defined running along an axial direction parallel to the longitudinal axis of the crankpin, and facing the end face of the connecting rod; and/or a defined rippled area with radially or circumferentially alternating projections and recesses positioned in a normal plane, which is normal to the longitudinal axis of the crankpin in the crankpin-side flank.

11. The reciprocating piston machine according to claim 1, wherein at least one energy storage device is arranged in the connecting rod which is or can be electrically connected to the at least one induction device and the control valve.

\* \* \* \* \*